June 6, 1967  T. C. HOLT ET AL  3,324,209
METHOD FOR THE MANUFACTURE OF FOAM RUBBER PRODUCTS
Filed Nov. 27, 1963  2 Sheets-Sheet 1
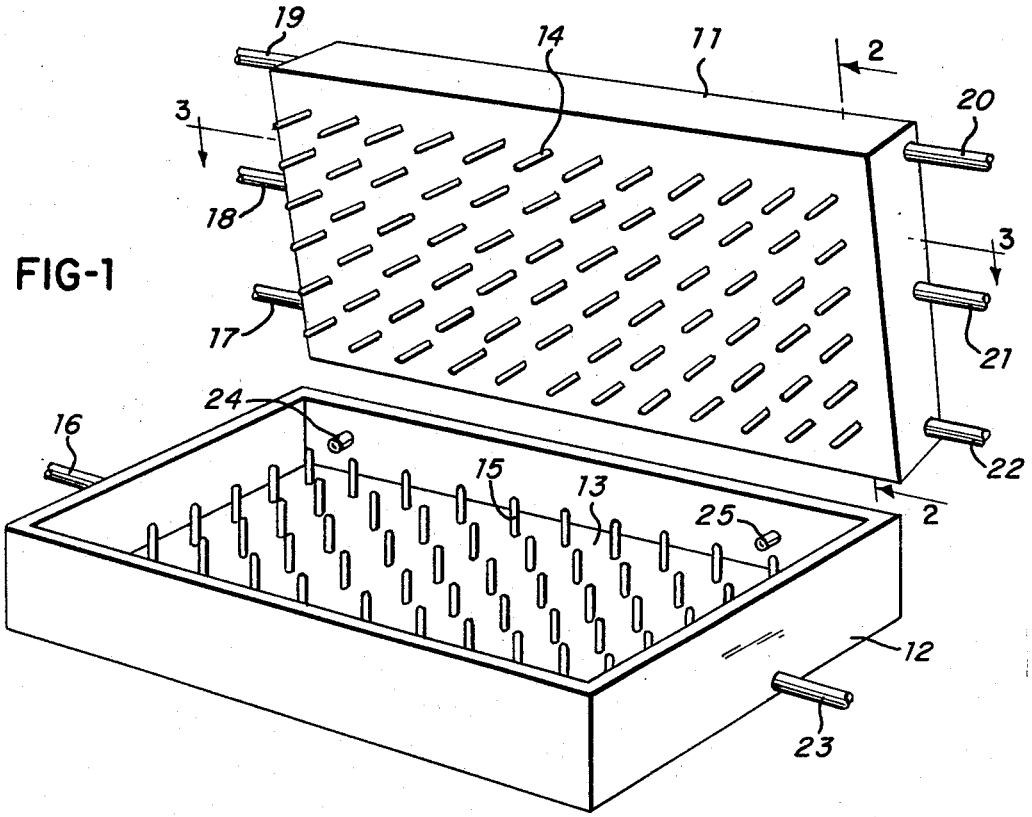
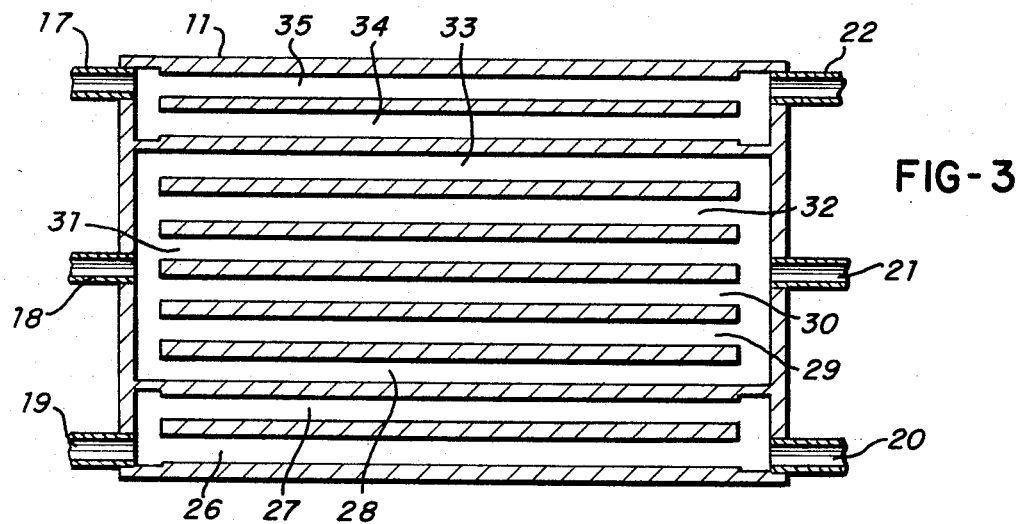
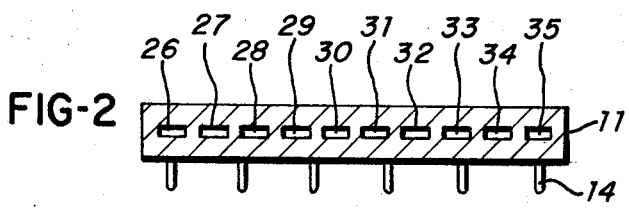
INVENTORS
THOMAS C. HOLT
CARL McCRACKEN, JR.
BY THOMAS TROGDON
ATTORNEY June 6, 1967 T. C. HOLT ET AL 3,324,209
METHOD FOR THE MANUFACTURE OF FOAM RUBBER PRODUCTS
Filed Nov. 27, 1963 2 Sheets-Sheet 2
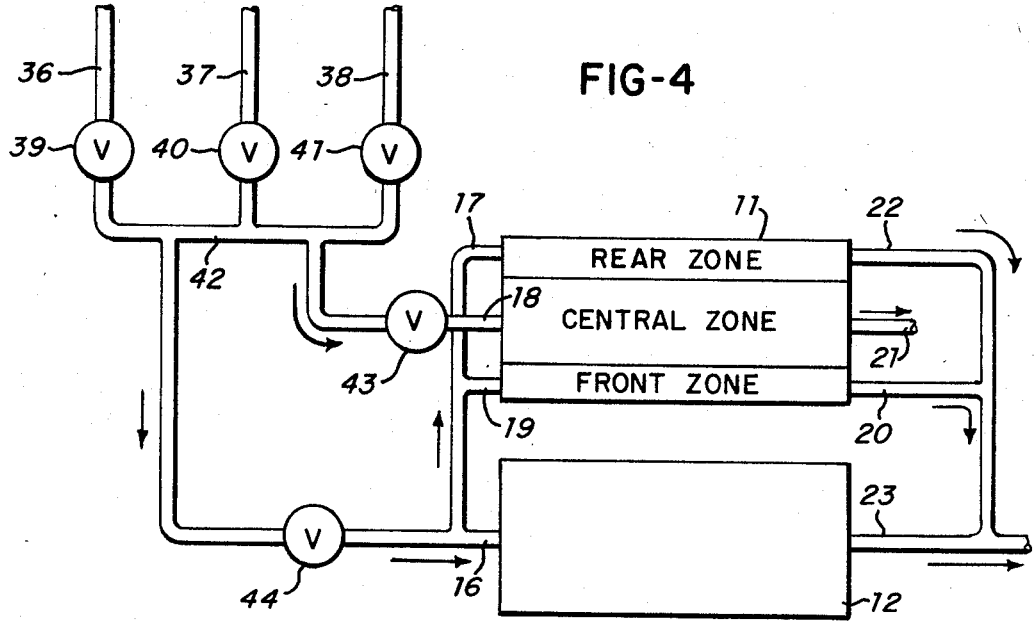
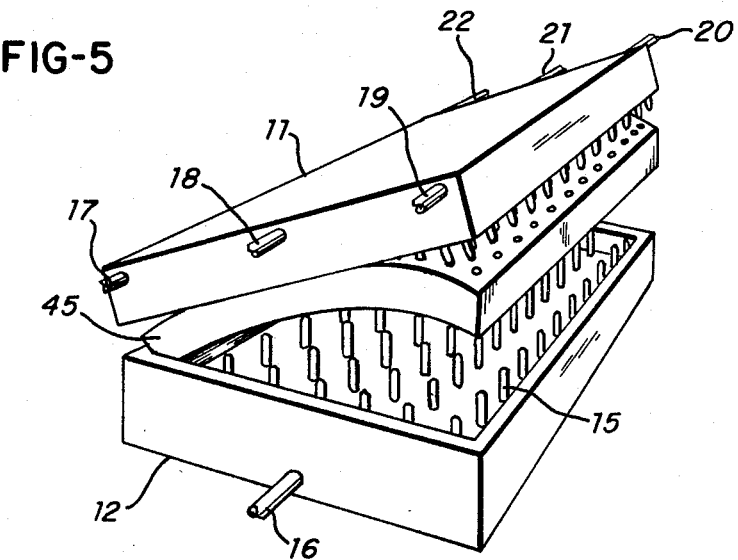
INVENTORS
THOMAS C. HOLT
CARL McCRACKEN, JR.
THOMAS TROGDON
BY
Reuben Wolk
ATTORNEY United States Patent Office 3,324,209
Patented June 6, 1967

3,324,209
METHOD FOR THE MANUFACTURE OF FOAM RUBBER PRODUCTS
Thomas C. Holt, Carl McCracken, Jr., and Thomas Trogdon, Waynesville, N.C., assignors to Dayco Corporation, Dayton, Ohio, a corporation of Ohio
Filed Nov. 27, 1963, Ser. No. 326,504
5 Claims. (Cl. 264—41)

This invention relates to a method for the manufacture of foam rubber products. More particularly, the invention relates to an improvement involving the steps of successive foaming, freezing, and vulcanization of foamable rubber latex according to a well-known process for the manufacture of foam rubber products, such as mattresses, pillows, or cushioning.

Foam rubber products have been manufactured by a process of compounding rubber latex in such a way that it is capable of foaming either by chemical or mechanical means. The latex is frothed and introduced into a closed mold and expanded to fill the mold, after which it is frozen in order to bring the foam to a solid state. The foaming is made permanent by introducing a gaseous coagulant into the mass in order to produce a stereoreticulate structure, that is, a mass of cellular material. The coagulated foam is then vulcanized in order to provide a permanent, finished product, and the mold is cooled. These steps are carried out by means of successive cycles in a closed mold consisting of an upper member, or lid, and a lower member having a cavity, both members having core pins located therein. These steps are commonly referred to as the Talalay process, and are more fully described in United States Patents No. 2,432,353 and No. 2,837,768.

When the above-described steps have been completed, the mold is opened and the finished foam rubber product is ready for removal. It has been found, however, that there is a tendency for the product to cling to parts of the mold, and particularly to the lower mold member. This occurs because of the weight of the product upon the member, and the tendency increases when long, small diameter core pins are used. These pins create small diameter corings which have a tendency to stick to the pins instead of being easily removed.

It is therefore a principal object of the present invention to provide a method which simplifies the removal of a foam rubber product from its mold.

It is a further object of the present invention to provide for the removal of the product without causing the product to stick to the mold and to create tears.

It is a further object to provide a method which permits self-stripping of the product from the mold.

In accordance with the present invention the problems are solved by the selective circulation of heat-exchange fluids having various temperatures, within the mold. By creating cooler areas in certain portions in the mold than in other portions thereof, the finished foam rubber product will tend to cling to those portions of the mold which are hotter and will have a self-stripping action in those portions of the mold which are cooler. The portion which has become stripped or separated from the mold will then provide a starting point for the removal of the entire product and will minimize any tendency to tear. More specifically, the hotter heat-exchanging fluid is circulated within the central portion of the mold lid, while the cooler fluid is circulated in the front and rear portions of the mold lid as well as in the lower or cavity portion of the mold. This tends to free the finished product from the cavity and from the front and rear portions of the lid, while causing the product to cling to the central portion of the lid as it is raised. The product is, therefore, readily accessible to the operator who merely needs to seize the front and rear portions of the product and gently pull them away from the central portion to which it clings. It has been found that by this process the product is readily removed from the mold and tearing is virtually eliminated.

The invention is fully described below and may be particularly under stood by reference to the following drawings, in which:

FIGURE 1 is a perspective view of a mold in which a typical foam rubber product is made.

FIGURE 2 is a sectional view of a portion of the mold taken along lines 2—2 of FIGURE 1.

FIGURE 3 is a sectional view of a portion of the mold taken along lines 2–3 of FIGURE 1.

FIGURE 4 is a schematic drawing illustrating the relationship of the mold and the fluid conveying system.

FIGURE 5 is a perspective view of a typical product in the mold as it is opened.

Referring now to the drawings, FIGURE 1 illustrates a typical mold for the manufacture of foam rubber products. The mold consists of an upper member or lid 11 and a lower member 12 having a mold cavity 13. Core pins 14 are fastened to the inner surface of the lid and similar core pins 15 are mounted on the base of the lower member and extend upwardly into the cavity. When the lid is closed the two halves form a completely enclosed cavity in which the core pins extend into the latex which has been foamed.

In order to provide the necessary steps of refrigerating and vulcanizing, as well as intermediate tempering processes, both halves of the mold are provided with passages in the walls through which fluid may be passed to effect heat exchange. This fluid will be conveyed into the lower half by means of inlet pipe 16 and into the upper half by means of inlet pipes 17, 18 and 19. To complete the cycle through the members the fluid will then be conducted away from the upper member by means of outlet pipes 20, 21 and 22 and from the lower member by outlet pipe 23. Also illustrated in FIGURE 1 are nozzles 24 and 25 for the injection of a gaseous coagulant into the cavity.

In the present invention the arrangement of the fluid conveying passages in the lower member is not of particular importance and consists of a conventional arrangement of passages longitudinally of the lower member through which the heat conducting fluid may pass. For this reason no detailed showing of this arrangement is presented. However, the invention depends on a particular arrangement of fluid passages in the upper member and this is shown in FIGURES 2 and 3 which are sectional views of the upper member. As shown in these two figures the upper mold member has a series of longitudinally extending channels 26, 27, 28, 29, 30, 31, 32, 33, 34 and 35. These channels are shown as being approximately rectangular and located on the plane which passes through the center of this member. It should be understood, of course, that these passages need not be of this shape nor need they be integrally located; they may be circular or oval in shape and they may consist of separate tubes which are mounted within the member. The primary purpose of these channels, however, is to conduct the heat exchanging and provide for an exchange of heat within the mold cavity. It is noted in FIGURE 3 that three separate and distinct zones are provided by means of the structure of the lid 11. The first of these zones consists of the channels 26 and 27, the inlet pipe 19, and the outlet pipe 20. This may be designated as the front zone. The central zone consists of the passages 28, 29, 30, 31, 32, and 33, the inlet pipe 18, and the outlet pipe 21. The rear zone is formed of passages 34 and 35, the inlet pipe 17, and the outlet pipe 22. It is thus obvious that separate fluids may be passed into the front, central and rear zones of the lid for purposes to be described below.

FIGURE 4 illustrates a schematic arrangement of the upper mold member 11 and lower mold member 12 together with the piping and valve system which provides the necessary fluid flow and heat exchange. The heat exchanging fluid is more fully described in the above-referenced Patent No. 2,837,768 and will preferably consist of ethylene glycol mixtures. The fluid will be retained in three separate tanks designated as refrigerating, tempering and vulcanizing tanks and will be maintained at approximately the temperatures designated in the above referenced patent. From the three tanks the fluid may flow through pipes 36, 37 or 38 into a header 42. Normally only one fluid at a time will be passed into the header and this is controlled by opening one of the three valves 39, 40 and 41 and closing the other two. For example, if refrigerating fluid is to be passed into the header the valve 39 will be opened and the valves 40 and 41 will be closed, thus drawing the refrigerating fluid from the pipe 36. From the header 42 fluid may be drawn through one of two passages, the first leading into valve 43 and then into inlet pipe 18 which leads to the central zone of the upper member. When this fluid is passed through the central zone it ultimately passes through outlet pipe 21 and then is returned to the appropriate tank by means of a similar arrangement of headers and valves. The other connection to the header 42 passes the fluid through valve 44 and is then branched off so that it may pass into the mold member through inlet pipe 16 and into the front rear zones of the upper member by means of inlet pipes 17 and 19. This fluid is then removed by means of outlet pipes 20, 22 and 23 and also returned to the zones through the same header.

Operation

The operation of the apparatus and the novel steps involved will be described below with reference to the description of the apparatus as explained above. Rubber latex which has been compounded to permit foaming is the basis of the finished product. This latex may either have a chemical foaming agent incorporated therein or may have been mechanically agitated just prior to introduction into the mold so that foaming will take place immediately thereafter. This latex is poured into the mold cavity 13 and the upper mold member 11 is then closed. After a short period of time the latex has foamed and completely filled the mold and thus consists of a nonstabilized stereoreticulated mass of latex. The valves 39, 43 and 44 are all opened, which permits refrigerating fluid to pass into all the mold passages and then return to the source of the refrigerating fluid. This circulation continues until the foam has been completely frozen. The valve 39 is then closed and coagulating gas is introduced into the mold cavity through the nozzles 24 and 25, this gas diffusing throughout the mass of rubber for a time sufficiently long to cause permanent coagulation of the mass. The valve 40 is then opened and tempering fluid at an intermediate temperature is passed through all passages in the mold members and circulated back to the source of fluid until the temperature has been raised. The valve 40 is then closed. The vulcanization step next occurs, and this is accomplished by opening valve 41 and passing the vulcanizing fluid through all passages and circulating the fluid back to the source until complete vulcanization of the foam rubber mass has occurred.

It is at this point that the novel concept occurs; in the prior art as described in the aforesaid Patent No. 2,837,-768, tempering fluid was again circulated throughout all the mold passages after vulcanizing in order to permit the foam rubber member to be stripped from the mold. However, it has been found that it is very difficult to remove the foam rubber product from the mold as the weight of the product tends to force it down tightly on the core pins in the lower mold half. When this occurs, attempts to remove the product would cause a tearing with the resultant loss of quality.

In accordance with the present invention, immediately after the vulcanizing step, tempering fluid is passed into the lower mold member passages and into the front and rear zones of the upper member as before. However, the tempering fluid is not passed into the central zone of the upper member, but instead the hot fluid is trapped in the central zone. This is accomplished as follows:

After circulation of the vulcanizing fluid is complete the valve 43 is closed which traps the hot vulcanizing fluid in the central zone of the upper member. Subsequently, the valve 41 is closed and the valve 40 is opened, passing tempering fluid into all other portions of the mold; that is, the lower mold member and the front and rear zones of the upper member. The circulation of the tempering fluid will be continued until the temperature is lowered to an acceptable stripping point. It is optional at this point whether the valve 44 is closed in order to trap the tempering fluid, or whether the tempering fluid continues to circulate; but in either case at this time the central zone of the upper member will be hotter than the remaining portions of the mold members. The mold lid is then raised and the product 45 within the mold will tend to cling to the hotter central zone and will be cleanly removed from the lower mold member. At the same time the front and rear portions of the product will tend to pull away from or sag from the front and rear zones. This relationship is illustrated in FIGURE 5. At this point the valve 43 is opened and a certain amount of tempering fluid is allowed to pass into the central zone of the upper member, while simultaneously the operator may seize the front and rear edges of the foam rubber product and pull it away from the mold. It should be noted that the stripping action is enhanced by a certain amount of lubrication which takes place along the surfaces of the core pins; this results from the formation of moisture which is condensed upon the pins because of the sudden lowering of temperatures.

The novel steps and apparatus in the present invention have been described with reference to certain specific relationships which are illustrated and described above. However, it is not intended that applicants be limited to the specific configuration shown, and modifications may be made within the scope of the invention.

We claim:

1. The method of manufacturing foam rubber products in a mold having upper and lower mold members comprising the steps of introducing foamable rubber latex into said mold, circulating a refrigerating fluid within said mold members to freeze said latex in its foamed state, introducing a coagulant into said latex to maintain said foamed state, circulating a tempering fluid within said mold members to raise the temperature of the frozen latex, circulating a heated fluid through said mold members to vulcanize said foamed latex, retaining said heated fluid in a portion of said mold members, and circulating a tempering fluid which is cooler than said heated fluid through the remaining portions of said mold members.

2. The method of claim 1 including the steps of retaining the heated fluid in a portion of the upper mold member, and circulating the tempering fluid in the remaining portion of the upper mold member and all of the lower mold member.

3. The method of claim 2 in which the heated fluid is retained in the central zone of the upper mold member.

4. In the manufacture of a foam rubber product in a mold comprising upper and lower mold members, the method of removing the product from the mold comprising the steps of heating one section of said mold members and cooling the remaining sections thereof, opening said mold, first removing those portions of the product in contact with the cooled mold section, and subsequently removing those portions of the product in contact with the heated section.

5. The method of claim 4 including the steps of heating the central section of the upper mold member and cooling the remaining sections of the mold.

References Cited

UNITED STATES PATENTS

| | | | |
|---|---|---|---|
| 993,970 | 5/1911 | Doritcour. | |
| 2,494,974 | 1/1950 | Wadleigh | 18—5.3 |
| 2,501,823 | 3/1950 | Leedom | 18—5.3 |
| 2,736,063 | 2/1956 | Heritage | 264—122 XR |
| 2,787,809 | 4/1957 | Stastny | 264—53 |
| 2,797,442 | 7/1957 | Wagner | 18—38 XR |
| 2,837,768 | 6/1958 | Talalay | 264—50 XR |
| 2,984,580 | 5/1961 | Glab | 264—124 XR |
| 3,225,126 | 12/1965 | Bridges et al. | 264—51 |

OTHER REFERENCES

Koppers Co. bulletin. "Dylite-Expandable-Polystyrene." C. 1954, pp. 21–24. Copy in 264—53.

ALEXANDER H. BRODMERKEL, *Primary Examiner.*

P. E. ANDERSON, *Assistant Examiner.*